(12) United States Patent
Clevenger et al.

(10) Patent No.: US 12,619,786 B2
(45) Date of Patent: May 5, 2026

(54) SYSTEM AND METHODS FOR SMART FLUID TRANSFER REGISTER APPLICATIONS

(71) Applicant: Advanced Flow Solutions, Inc., Oklahoma City, OK (US)

(72) Inventors: Dan Clevenger, Stokesdale, NC (US); Jeff Hageman, Lindenhurst, IL (US)

(73) Assignee: Advanced Flow Solutions, inc., Oklahoma City, OK (US)

( * ) Notice: Subject to any disclaimer, the term of this patent is extended or adjusted under 35 U.S.C. 154(b) by 457 days.

(21) Appl. No.: 18/149,843

(22) Filed: Jan. 4, 2023

(65) Prior Publication Data

US 2023/0214531 A1 Jul. 6, 2023

Related U.S. Application Data

(60) Provisional application No. 63/296,256, filed on Jan. 4, 2022.

(51) Int. Cl.
*G06F 21/62* (2013.01)
*G01F 1/86* (2006.01)

(52) U.S. Cl.
CPC ............ *G06F 21/6281* (2013.01); *G01F 1/86* (2013.01)

(58) Field of Classification Search
CPC ......... G06F 21/6281; G06F 21/62; G01F 1/86
See application file for complete search history.

(56) References Cited

U.S. PATENT DOCUMENTS

2014/0167976 A1* 6/2014 Barrett ................... G01D 4/004
340/870.02
2016/0058933 A1* 3/2016 Ballantyne ............ G06F 21/565
210/85

(Continued)

FOREIGN PATENT DOCUMENTS

AU 2015346404 A1 * 6/2017 ............. G06F 21/62

OTHER PUBLICATIONS

The International Search Report and Written Opinion of the International Searching Authority for corresponding PCT application No. PCT/US2023/060084, dated Apr. 12, 2023, 13 pages.

*Primary Examiner* — Jayesh M Jhaveri
(74) *Attorney, Agent, or Firm* — Tucker Ellis LLP; Michael G. Craig

(57) ABSTRACT

One or more techniques and/or systems are disclosed for a smart pump register device used during fluid transfer operations. The register allows third party software, such as third-party applications, to be downloaded to the register. The third-party software may be downloaded from a cloud-based application store without hardware modifications. The third-party software may be used for various tasks associated with fluid transfer events. A fluid transfer system can comprise a cloud computing environment that can maintain an application database of third-party applications. A register device can comprise a regulated software portion and an unregulated software portion. The unregulated portion can run third party applications downloaded from the application database, and the regulated portion can remain isolated from the unregulated portion to maintain integrity of the regulated portion. A metering device can be used to communicate metering data to the register.

20 Claims, 8 Drawing Sheets

(56) References Cited

U.S. PATENT DOCUMENTS

| | | |
|---|---|---|
| 2017/0019248 A1 | 1/2017 | Mustafa et al. |
| 2020/0126401 A1* | 4/2020 | Clevenger ........ G06K 19/06037 |
| 2021/0031946 A1* | 2/2021 | Hageman .................. B64F 1/28 |
| 2021/0293576 A1 | 9/2021 | Schamber |
| 2023/0177149 A1* | 6/2023 | Ballantyne ............. G16H 40/60 |
| | | 210/85 |

* cited by examiner

W&M = Weights & Measures Gov't Authority

SYSTEM AND METHODS FOR SMART FLUID TRANSFER REGISTER APPLICATIONS

CROSS-REFERENCE TO RELATED APPLICATIONS

This application claims priority to U.S. Provisional Patent Application Ser. No. 63/296,256, entitled SYSTEM AND METHOD FOR SMART REGISTER APPLICATIONS, filed Jan. 4, 2022, which is incorporated herein by reference.

BACKGROUND

Pumps can be used to transfer liquid from a source to a target delivery location, such as transferring fuel from a storage vessel to a target vehicle. Often, when transferring fluids, such as fuels, from a storage vessel to a receiving vehicle or container, a metering apparatus is used to identify an amount of liquid transferred so that appropriate records may be maintained. A metering register device may be connected to the metering apparatus or various other devices to collect data associated with the fluid transfer.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

As one example, a system of web-based applications can be provided for use in the fluid transfer industry. In one implementation, a smart fluid register device can be devised to allow third party software (e.g., third party applications) to be downloaded to the fluid register. In some implementations, the third-party software may be downloaded (e.g., installed) on the fluid register from a web-based application store and may require little to no hardware modifications. The third-party software may be used for various tasks associated with fluid transfer needs of the third party. By way of example, the third-party software may be used for data collection, dispatching, remote diagnostics, valve control, inventory management, training, customer data customization, and more.

In one implementation, a fluid transfer system can comprise a cloud computing environment that comprises a remote computer. In this implementation, the remote computer can be configured to maintain an application database of third-party applications. Further, a fluid transfer register can comprise a regulated software portion, and an unregulated software portion. In this implementation, the unregulated portion is configured to run at least one third party application that is downloaded from the application database. Additionally, at least one element of the regulated portion is isolated from at least one element of the unregulated portion using hardware and/or software separation. A fluid meter can generate fluid metering data indicative of measured fluid flow characteristics, and can communicate the metering data to the fluid transfer register.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

DETAILED DESCRIPTION

Figure 1:
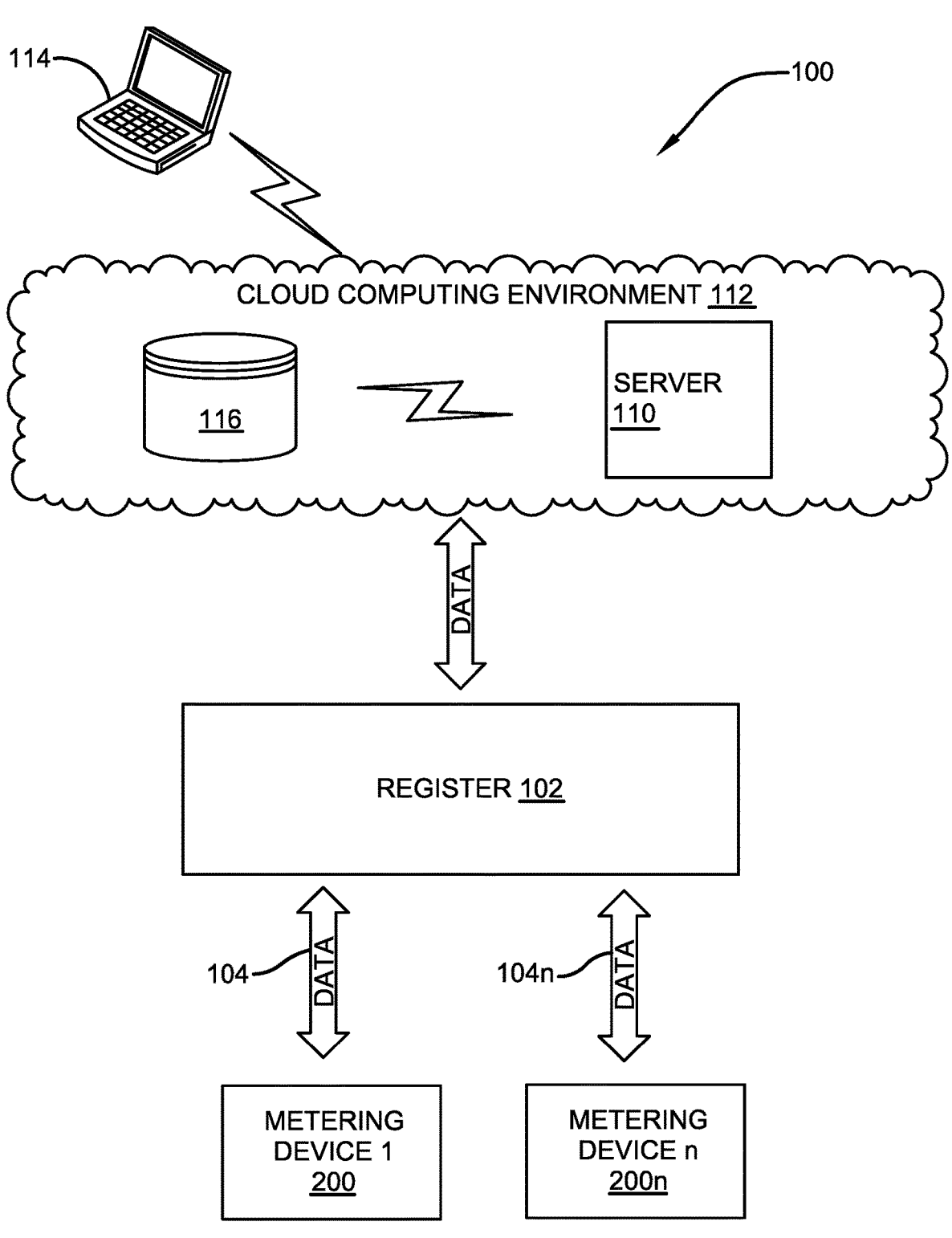
FIG. 1 is a component diagram illustrating an exemplary system where one or more portions of one or more systems described herein may be implemented.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

A cloud computing or web-based application platform and/or application store (or "app-store") may be provided to allow third party entities to implement software, applications, or other solutions in either mobile or stationary transfer of fluids markets. A fluid metering register (referred to herein as a "metering register" or a "register") may be configured to allow third parties to deploy their own software solutions or applications onto the register, using the web-based application store. In some cases, the third-party software may be deployed with little to no hardware modifications. For example, software installation, applications, and updates may be completed via wireless communication (e.g., over-the-air), with the cloud computing or web-based application platform, such as based in a remote computer (e.g., server) or remote computers (servers).

In some implementations, the register may utilize hardware and/or software separation technique (e.g., sandboxing) to separate regulated and unregulated metering functionality (e.g., sometimes referred to as legally relevant (LR) and non-legally relevant (NLR) functionality). For example, regulated functionality may include various weights, measures, and metering functionality required for audits and ticketing, etc., which can be regulated by industry service groups, government agencies, or other industry associations for the benefit of the end users (e.g., customers). Unregulated functionality (e.g., not subject to industry regulation) may include functionality related to third party applications, wireless communication, or other customizable functionality. It may be desirable to separate the regulated functionality from the unregulated functionality (e.g., by hardware and/or software separation) to provide for security and integrity of the regulated functionality. That is, for example, it is desirable to keep the regulated functionality unchangeable by unauthorized third parties, so that the end-users are provided assurances of the integrity of the data generated by the regulated functions.

Various elements of the features or systems described herein may be deployed on vehicles such as portable fluid transfer platforms, stationary transfer platforms, trucks, in the cloud, or in mobile applications/devices. This may improve interoperability of various hardware elements, may enable the development of new automated solutions for generated data, and may significantly streamline the access to critical operating data.

FIG. 1 depicts an exemplary system 100 where one or more features of one or more systems described herein may be implemented. The system 100 can include a register 102 configured to communicate with a plurality of metering devices 200-200n. The register 102 (e.g., a fluid transfer register), can receive data from a plurality of devices 200a-200n, such as a fluid meter (e.g., metering device), using a wired or wireless communication link. For example, the register 102 can receive a signal 104 from the metering device 200 (e.g., the register may poll the meter for data, and/or the meter may transmit the signal). In this example, the metering device 200 may be a fluid flow meter and the signal 104 may be data indicative of one or more flow characteristics of the metered fluid (e.g., flow rate, fluid pressure, density, etc.). In other examples, the metering device 200 may be an actuator (e.g., motor) controlled valve, and the signal 104 may include data indicative of a valve position or valve position command. It should be appreciated that the register 102 can be located locally (e.g., on-board, integrated with, etc.) to the various metering devices, or remotely from the meter (e.g., as a separate unit or device). The register 102 can receive the signal 104 (e.g., or signals 104-104n), store the corresponding information, and/or perform one or more processing operations or calculations using the received data comprised in the signal.

In some implementations, the register 102 can communicate information in a raw (e.g., unprocessed) form or a processed form to a remote computer or computers (e.g., server(s)) 110. It should be appreciated that a server 110 can be local (e.g., to the site of the operation but remote from the register), remote (e.g., from the site of the operation), or cloud-based as part of a cloud computing environment 112. The server 110 can also be distributed among multiple locations and/or computing devices. It is to be appreciated that the remote computing device 110 can comprise one or more of an application store, a website, a server device, a computer, a cloud-service, a processor and memory, or a computing device connected to the Internet and connected to a user device 114. In general, a network can be implemented to couple one or more devices or system 100 via wired or wireless connectivity, over which data communications are enabled between devices and between the network and at least one of a second network, a subnetwork of the network, or a combination thereof. It is to be appreciated that any suitable number of networks can be used with the subject innovation and data communication on networks can be selected by one of sound engineering judgment and/or one skilled in the art.

In certain implementations, the cloud computing environment 112 can also include a database 116. The database 116 can receive information from the server 110 regarding various third-party applications or may store various third-party applications and their corresponding data. In other implementations, the database 116 can receive information regarding the various metering devices 200, information, alerts, notifications, historic sensor information, user information, among other information. The database 116 may be a standalone storage component or it may exist as part of the server 110.

A user device 114 may communicate with the cloud computing environment 112 to send and receive information to and from the server 110 and/or the database 116. The user device 114 may be, for example, a computer, or a mobile device such as a smartphone or tablet, a wearable device, among others. The user device 114 may interact with an application operating on the server 110 or on the register 102. When executed, the application can interact with the user device 114 and/or the various metering devices 200-200n to allow a user to view meter information (e.g., regulated metering results), view corresponding notifications or alerts, manipulate sensor information, or update settings for the server 110, register 102, or other requests. The user device 114 can provide a user interface that allows for user interactions with a corresponding application running on the server 110, the user device 114, or the register 102. It should be appreciated that in certain implementations, various applications may also exist locally on the user device 114 or the register 102 or may exist on the server 110.

Figure 2:
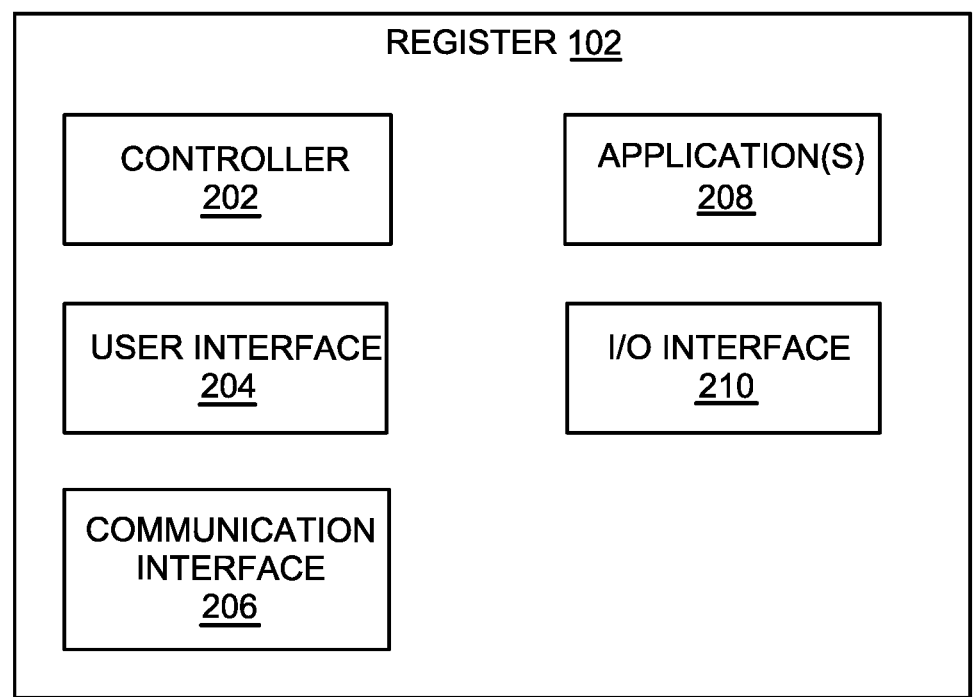
FIG. 2 is an exemplary implementation of a register where one or more portions or one or more systems described herein may be implemented.

FIG. 2 illustrates and exemplary implementation of the register 102. The register 102 may comprise a controller 202, a user interface 204, a communication interface 206, one or more applications(s) 208, and an I/O (input/output) interface 210.

One of ordinary skill in the art can appreciate that the various implementations of the application 208 described herein can be implemented in connection with any metering device, computing device, client device, or server device, which can be deployed as part of a computer network, a metering network, or in a distributed computing environment such as the cloud. The various implementations described herein may be implemented in substantially any computer system or computing environment having any number of memory or storage units, any number of processing units, and any number of applications and processes occurring across any number of storage units and processing units. This includes, but is not limited to, cloud environments with physical computing devices (e.g., servers, metering registers, etc.) aggregating computing resources (i.e., memory, persistent storage, processor cycles, network bandwidth, etc.) which are distributed among a plurality of computable objects.

In an example, the physical computing devices can intercommunicate via a variety of physical communication links such as wired communication media (e.g., fiber optics, twisted pair wires, coaxial cables, etc.) and/or wireless communication media (e.g., microwave, satellite, cellular, radio or spread spectrum, free-space optical, etc.). The physical computing devices can be aggregated and exposed according to various levels of abstraction for use by application or service providers, to provide computing services or functionality to client computing devices. The client computing devices or user device 114 can access the computing services or functionality via application program interfaces (APIs), web browsers, or other standalone or networked applications. Accordingly, aspects of the application 208 can be implemented based on such a cloud environment. For example, the application 208 can reside in the cloud computing environment 112 such that the computer-executable instructions implementing the functionality thereof are executed with the aggregated computing resources provided by the plurality of physical computing devices. The cloud computing environment 112 provides one or more methods of access to the subject innovation, which are utilized by the application 208. In an implementation, software and/or a component can be installed on the user device 114 to allow data communication between the user device 114 and the cloud computing environment 112. In another implementation, software and/or a component can be installed on the register 102 to allow data communication between the register 102 and the cloud computing environment 112. These methods of access include IP addresses, domain names, URLs, etc. Since the aggregated computing resources can be provided by physical computing device remotely located from one another, the cloud computing environment 112 can include additional devices such as a router, load balancers, switches, etc., that appropriately coordinate network data.

In an implementation, the register 102 may allow third party software or applications 208 to be installed on the register 102. Third party applications may include applications developed by customers, vendors, or original equipment manufacturers (OEMs) (referred to as "third parties"). It may be desirable for third parties to develop their own applications to run on the register 102. For instance, third parties may be able to develop applications for data monitoring, training, vendor specific applications, and the like. There are no registers on the market currently that allow third parties to customize or create applications in this manner.

In an implementation, third parties may create their own applications 208 and/or download applications from an application store hosted remotely (e.g., on cloud computing environment 112). The applications 208 may be installed onto and ran via the register 102. Alternatively, the applications 208 may be ran remotely on a server (e.g., server 110). In an implementation, the applications 208 may be installed onto the register 102 from a cloud computing environment 112 via wired or wireless connection. In the same manner, the applications 208 may be updated via wired or wireless connection. Those skilled in the art will appreciate the numerous benefits associated with the ability to create third party applications for use on a register device 102.

Registers on the market, however, are commonly regulated according to industry standards, specifications, and audit requirements. This makes it difficult, if not impossible, for third party software or applications to be installed on a register without violating the industry standards or specifications.

In an implementation described herein, the register 102 may be partitioned into a regulated portion and an unrelated portion (also referred to as legally relevant (LR) and non-legally relevant (NLR), respectively). The regulated portion may contain the necessary code to run the register and its corresponding regulated functions, such as metering, measurements, and other audited data. The unregulated portion may contain necessary software components to allow for various third-party application or software capabilities.

Figure 3:
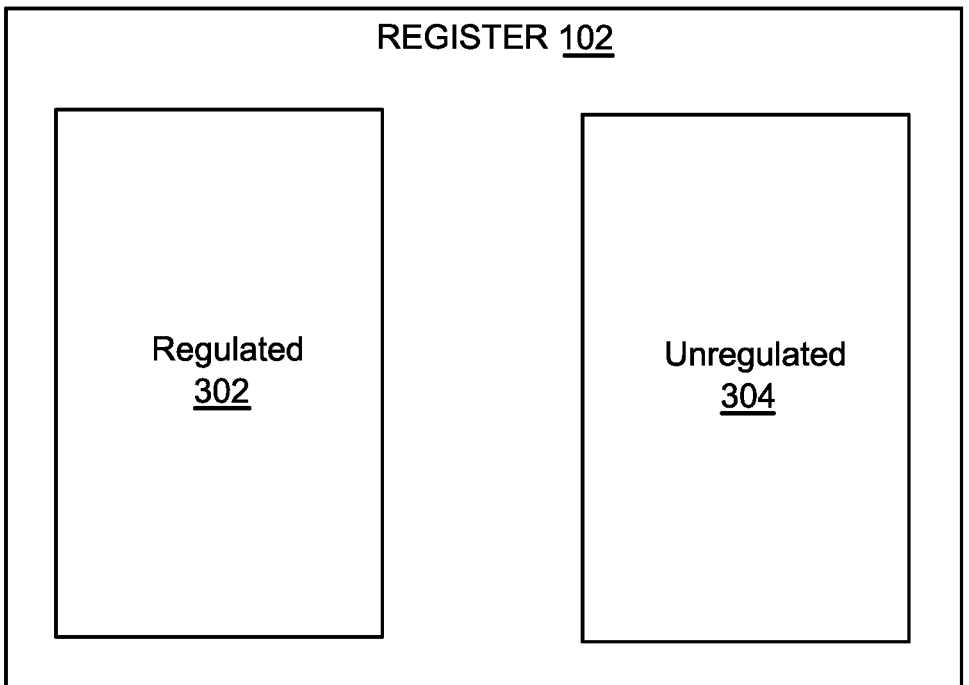
FIG. 3 is an exemplary implementation of register partitions where one or more portions or one or more systems described herein may be implemented.

Turning to FIG. 3, the regulated portion 302 and the unregulated portion 304 may be completely separated from one another such that the regulated portion 302 and register 102 meet industry standards and specifications. Separation between the regulated portion 302 and the unregulated portion 304 may be accomplished by hardware separation, software separation, or a combination of hardware and software separation.

For instance, in an implementation, a third party may be granted access to the unregulated portion 304, while denied access to modify components of the regulated portion 302. In other instances, the regulated portion 302 may utilize a protective interface to communicate with the unregulated portion 304. For example, digital signatures may provide authentication for software to be installed onto the register. In other implementations, a MD5 checksum may be utilized to ensure that software of the regulated portion 302 is not overwritten or corrected by non-OEM applications, such as third-party software. Yet in other implementations, the register 102 may be configured with multiple layers of access or permissions that are implemented by user specific access. In other words, users may have different security levels with different access permissions.

Figure 4:
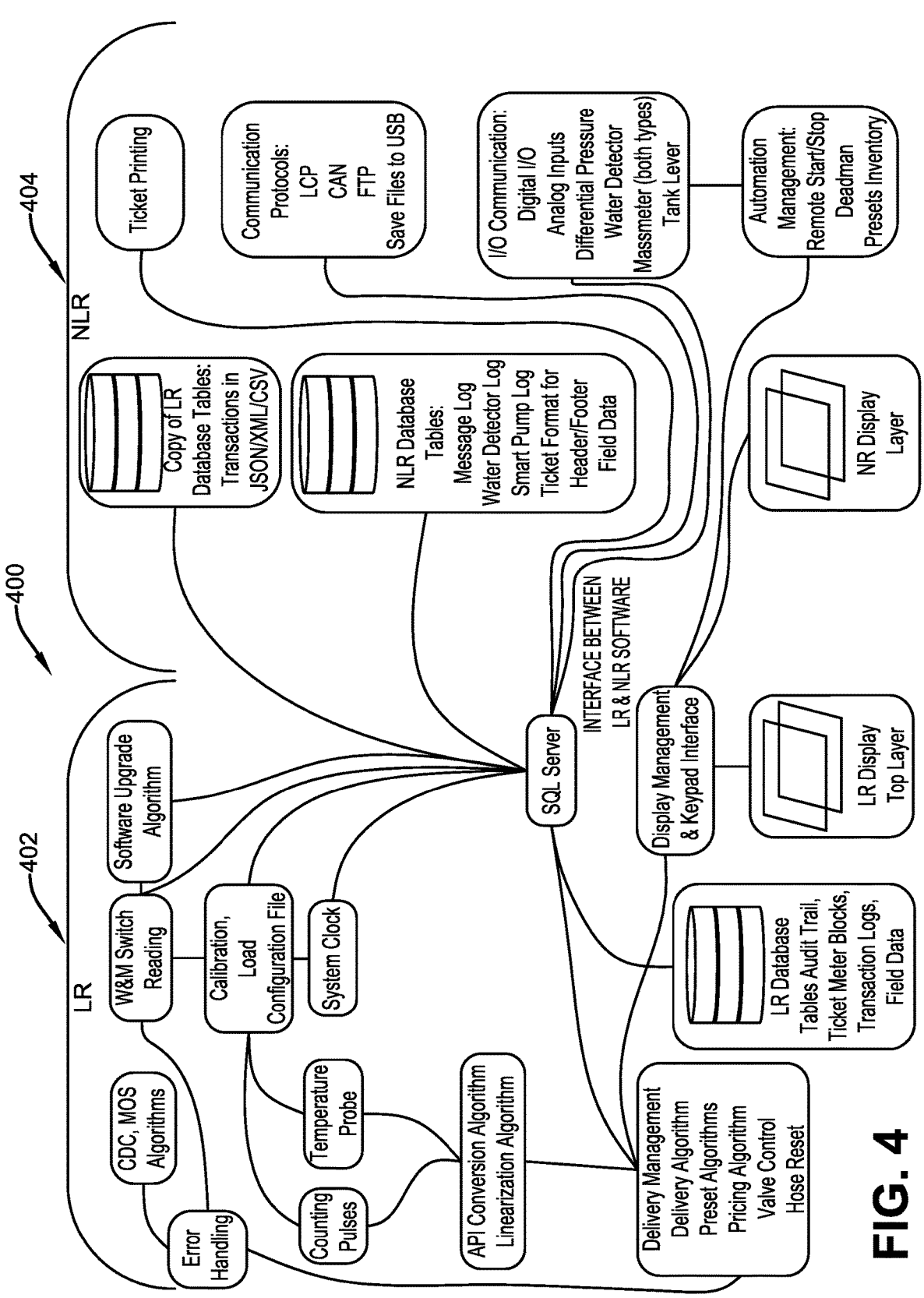
FIG. 4 is a system diagram illustrating an exemplary system where one or more portions of one or more systems described herein may be implemented.

Turning to FIG. 4, an exemplary implementation of a system architecture for a software-separated system is shown generally at 400. The system 400 illustrates a regulated portion 402 (legally relevant (LR) and an unregulated portion 404 (non-legally relevant (NLR). The regulated portion 402 may handle various tasks and functions that are separated from the unregulated portion 404. For instance, the regulated portion 402 may handle, control, or operate any of the following: CRC & MD5 algorithms, error handling, software upgrade algorithms, W&M switch reading, calibration, pulse counting, temperature probing, system clock functions, API conversion algorithms and linear conversion algorithms, and delivery management algorithms. Delivery management may include delivery algorithms, preset algorithms, pricing algorithms, valve control, and hose resetting. The regulated portion may also include a regulated database including audit trail tables, ticketing meter blocks, transaction logs, and field data.

Further, in an exemplary implementation, the unregulated portion 404 may handle, control, or operate any of the following: ticket printing, communication protocols, input/output (I/O) communication, and automation management. The unregulated portion 404 may further include: a copy of the LR database, and an NLR database. The automation management may include remote start and stop control, deadman control, presets, and inventory.

In an implementation, the system 400 can include an interface between software of the regulated portion 402 and software of the unregulated portion 404. For instance, interface may include at least a SQL server and a display management & keypad interface. Digital signatures and an MD5 checksum may be utilized to ensure that software of the regulated portion 402 is not overwritten or corrected by non-OEM applications, such as third-party software running on the unregulated portion 404.

In another exemplary implementation, separation between a regulated portion 302 and an unregulated portion 304 may be accomplished using a software separation product, such as Trust Zone, software-based isolation product. In this example, software isolation may be accomplished at the processor level such that two separate operating systems are utilized. Access may be granted, applied, limited, or restricted between software elements to achieve a desired separation between software elements.

In another implementation, the separation between a regulated 302 and an unregulated portion 304 of the register (e.g., register 102) may occur at the hardware level. Yet in other implementations, the register 102 may utilize hardware and software that allows for both software and hardware separation (e.g., isolation). In either instance, elements of the regulated 302 portion may be isolated from elements of the unregulated portion 304 to achieve a desired separation scheme. The desired separation scheme may be based at least in part on regulations, protocols, audit requirements, and industry standards.

In an exemplary implementation, an audit of the register 102 may be required whenever portions of software code are changed or updated on the register 102. An audit may be avoided using the various software or hardware separation described above. For instance, so long as proper isolation occurs between regulated 320 and unregulated portions 304, an audit may be avoided (e.g., when changes occur only on the unregulated portion 304 and not the regulated portion 302). In other words, the changes that occur on the unregulated portion 304 may not affect the regulated portion 302 when the two are properly isolated. In this manner, a user may be able to install third party applications, updates, and the like, on the unregulated portion 304 without prompting an audit of the register 102 (e.g., because the regulated portion 302 is isolated and unchanged).

Figure 5:
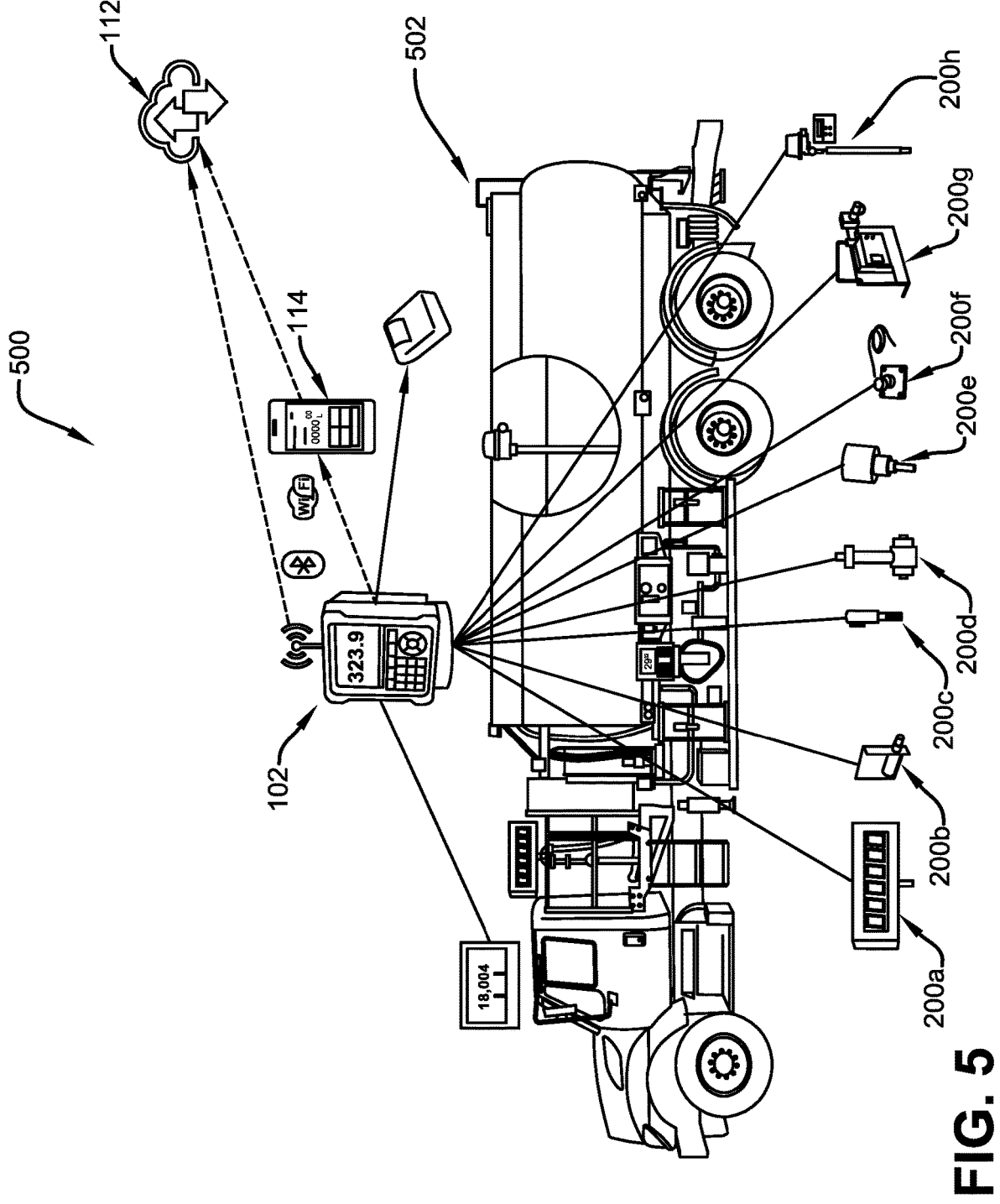
FIG. 5 is an exemplary system where one or more portions of one or more systems described herein may be implemented.

FIG. 5 illustrates an exemplary implementation of a system 500 where one or more systems or methods described herein may be implemented. For instance, system 500 may include a register 102, a user device 114, a cloud computing environment 112, a fuel truck 502, and a plurality of metering devices 200a-200h. In this implementation, data from metering devices 100a-200h may be communicated to the register 102 and transmitting to a user device 114 or a user interface of the truck 502. User device 114 or register 102 may include third party applications downloaded from the cloud computing environment 112, by wireless communication for example.

Figure 6:
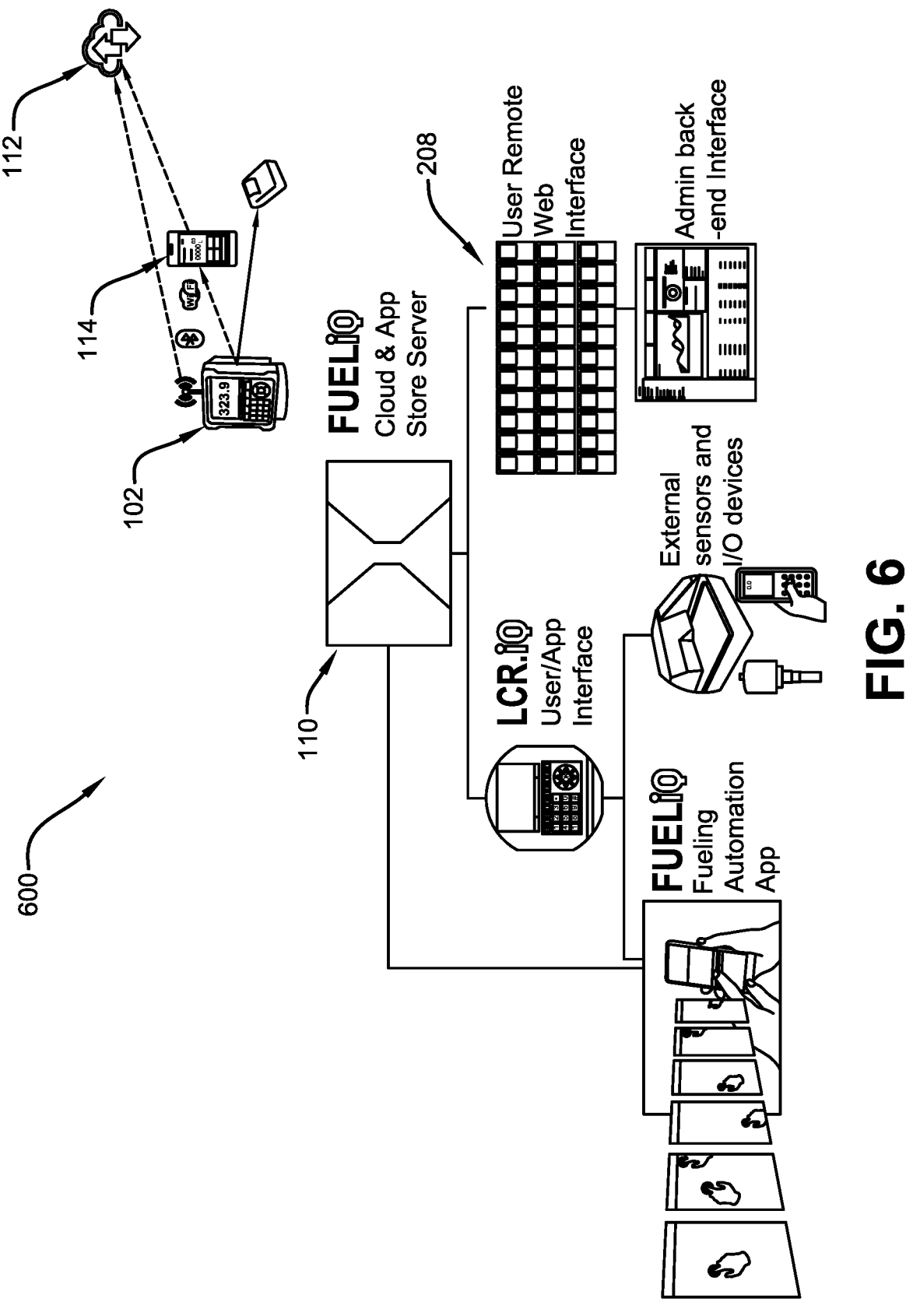
FIG. 6 is an exemplary system where one or more portions of one or more systems described herein may be implemented.

FIG. 6 illustrates an exemplary implementation of a system 600 where one or more systems or methods described herein may be implemented. For instance, system 600 may illustrate details of a third-party application system. System 600 may include a register 102, a user device 114, a cloud computer environment 112, server 110, and various applications 208. In this implementation, third parties or customers may design and build their own applications 208 that may reside on the server 110 and that may operate on the register 102.

In one implementation, applications 208 may be either public or private. Public applications may be accessible to all users on a network. In contrast, private applications may be accessible by those users that the developer of the application chooses.

In an exemplary implementation, a third party may design and create an application configured to monitor specific sensors. The application may collect data from various sensors of a system and may display the data in a specific manner on a specific user interface. For instance, the display may include desired units, color, text size, company logo, etc. The third-party application may further display indicators, statuses, and interlocks according to third party requirements. It should be appreciated that third party application functionality may be wholly different and customized compared to standard OEM functionality that is commonly found on standard registers.

In another implementation, customers may create training applications or guided use applications to guide the fuel operator through certain safety checks, system checks and even custom screens having customer specific branding and workflows. In this regard, customers may enable applications that are made specific to their own safety interlocks or third-party sensors. Third parties may develop applications configured specifically for their brand of sensors or devices.

In another exemplary implementation, a third party may create an application that utilizes location data from a GPS system of a tanker trick for example. The system and third-party application may provide a customized user interface to interlink location data from a truck and metering data from the register.

In yet another, implementation, a third-party application may be utilized that communicates wirelessly with a credit card reader to facilitate point-of-sale (POS) transactions between vendors.

Figure 7:
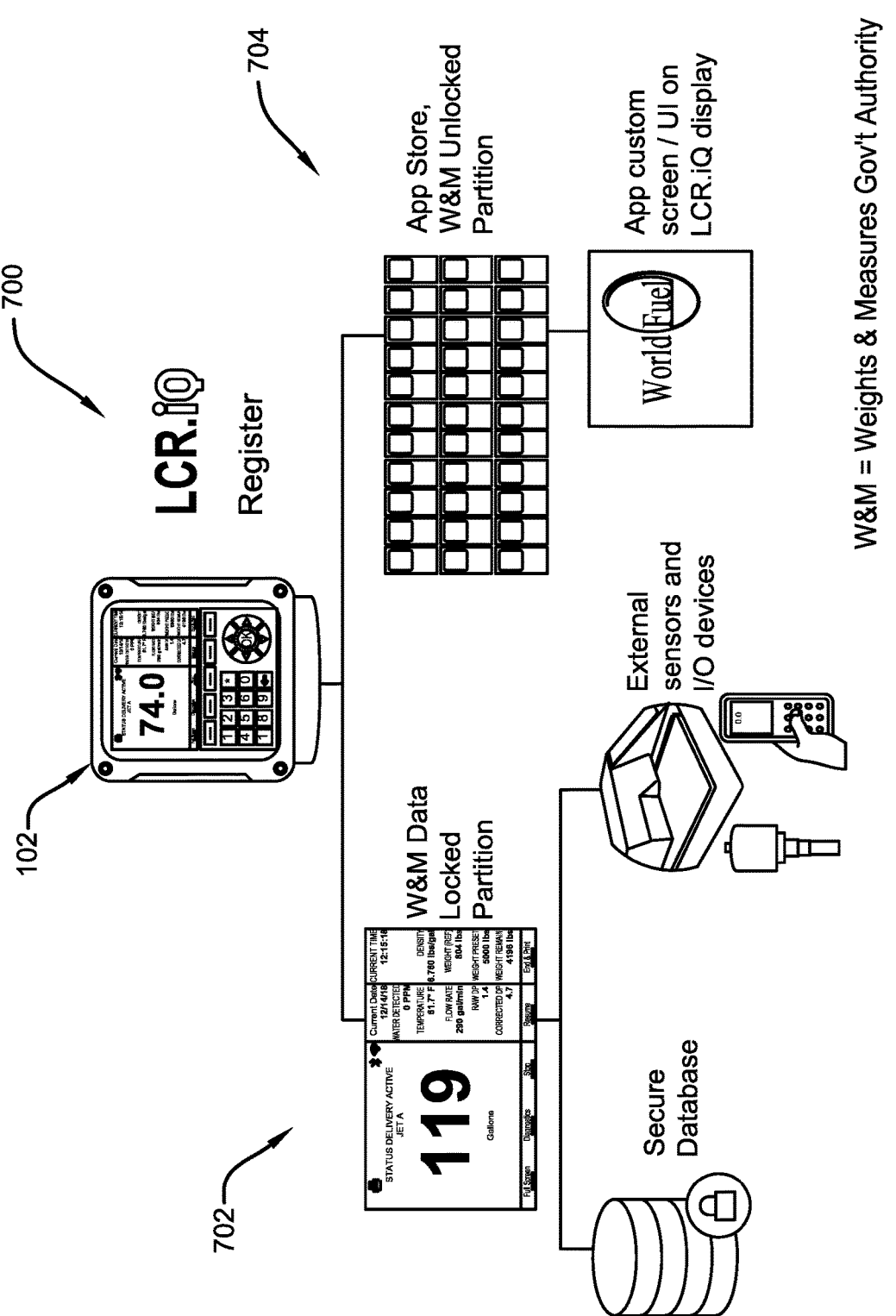
FIG. 7 is an exemplary system where one or more portions of one or more systems described herein may be implemented.

FIG. 7 illustrates an exemplary implementation of a system 700 that includes a regulated partition 702 and an unregulated partition 704. The regulated partition 702 may include a weights and measures (government regulated) partition with a secure database. The regulated partition 702 may communication with specific external sensors and I/O devices necessary to perform required operations. The unregulated partition 704 may include an application store and custom application screens that may be displayed on the register 102.

In this implementation, third party applications 208 may have the ability to present custom screens, menus, workflows, user interfaces, outputs, and data storage according to their unique design and end-use business case. Users and third parties may develop their own applications and may upload the applications 208 to registers 102 without requiring full software upgrades, for example. In other words, applications 208 may be updated and installed individually without changes to all software of the register 102.

Figure 8:
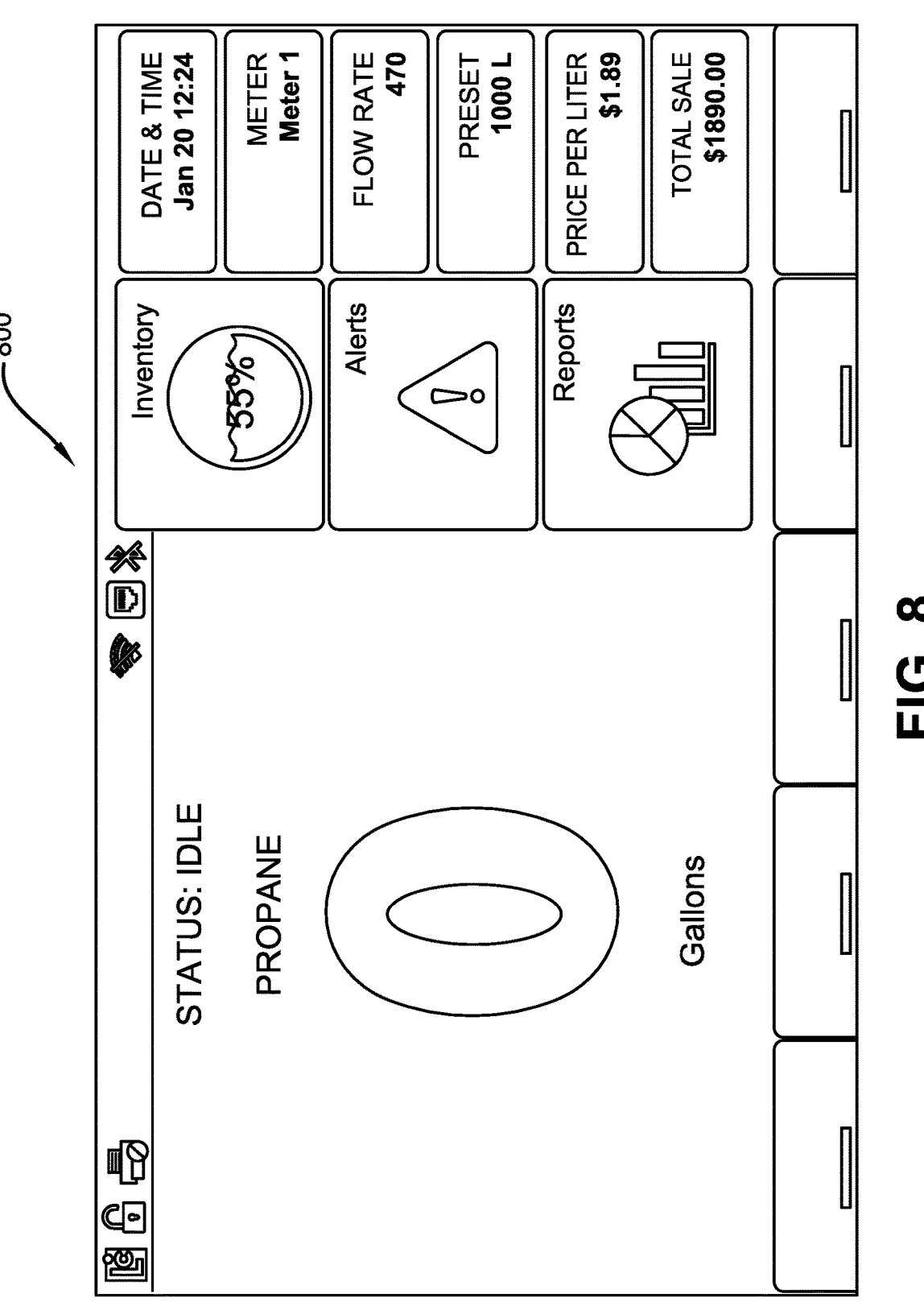
FIG. 8 is an exemplary display of a register device where one or more portions of one or more systems described herein may be implemented.

FIG. 8 illustrates an exemplary implementation of a user interface 800 that may be developed and configured on a register 102.

Although various examples are provided herein, it should be appreciated that any third-party application may be developed and implemented on a register 102 according to the descriptions and implementations described herein.

Moreover, the word "exemplary" is used herein to mean serving as an example, instance or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, at least one of A and B and/or the like generally means A or B or both A and B. In addition, the articles "a" and "an" as used in this application and the appended claims may generally be construed to mean "one or more" unless specified otherwise or clear from context to be directed to a singular form.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes," "having," "has," "with," or variants thereof are used in either the detailed description or the claims, such terms are intended to be inclusive in a manner similar to the term "comprising."

The implementations have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

What is claimed is:

1. A fluid transfer system, comprising:
   a network-based computing environment comprising a remote computing device, wherein the remote computing device maintains an application database of one or more downloadable, third-party applications;
   a fluid transfer register, comprising:
      a regulated software portion; and
      an unregulated software portion, the unregulated portion is configured to run at least one third party application downloaded from the application database;
      wherein at least one element of the regulated software portion is communicatively isolated from at least one element of the unregulated software portion using hardware and/or software separation, such that the at least one isolated element of the unregulated software portion cannot communicate with the at least one regulated element of the regulated software portion; and
   a fluid meter that operably generates fluid metering data indicative of measured fluid flow characteristics and communicates the fluid metering data to the fluid transfer register.

2. The system of claim 1, the fluid transfer register integrated with the fluid meter.

3. The system of claim 1, the fluid transfer register communicatively coupled with the fluid meter wirelessly or using a wired connection.

4. The system of claim 1, the fluid flow characteristics comprising one or more of:
   flow rate;
   fluid pressure; and
   fluid density.

5. The system of claim 1, the regulated software portion of the fluid transfer register communicatively isolated from unregulated software portion such that any one of the one or more third party application is unable to transmit data to any part of the regulated software portion.

6. The system of claim 1, the regulated software portion of the fluid transfer register comprising one or more regulated software elements configured to process the fluid metering data to generate regulated results data indicative of regulated fluid transfer information.

7. The system of claim 6, the regulated software portion of the fluid transfer register configured to allow any one of the one or more regulated software elements to communicate regulated results data to the network-based computing environment, and any one of the one or more third party applications are configured to receive the regulated results data from the network-based computing environment.

8. The system of claim 7, the network-based computing environment comprising a regulated results data database that operably stores regulated results data received from one or more regulated software elements in the regulated software portion, wherein the one any one of the one or more third party applications on the unregulated software portion are configured to access the regulated results data from the regulated results data database.

9. The system of claim 6, the regulated software portion of the fluid transfer register configured to allow any one of the one or more regulated software elements to communicate regulated results data to the unregulated software portion such that any one of the one or more third party application is able to receive the regulated results data.

10. The system of claim 1, comprising a user computing device operably, communicatively coupled with the network-based computing environment to receive data indicative of fluid flow characteristics, processed data indicative of regulated fluid transfer information, and/or data indicative of fluid flow characteristics processed by one of the one or more third party applications resident on the unregulated portion of the fluid transfer register.

11. The system of claim 10, the user computing device operably displaying information related to the fluid flow characteristics, regulated fluid transfer information, and/or fluid flow characteristics processed by one of the one or more third party applications.

12. The system of claim 10, the user computing device configured to operably receive input from a user and communicate the input to the network-based computing environment, wherein the input is indicative of a command for an operation by one of the one or more third party applications resident on the unregulated portion of the fluid transfer register.

13. The system of claim 1, comprising a user computing device operably, communicatively coupled with the fluid transfer register to receive data indicative of fluid flow characteristics, processed data indicative of regulated fluid transfer information, and/or data indicative of fluid flow characteristics processed by one of the one or more third party applications resident on the unregulated portion of the fluid flow register.

14. A fluid transfer system, comprising:
   a fluid transfer register configured to generate regulated results data indicative of regulated fluid transfer information, the fluid transfer register comprising:
      a control unit comprising a processor for processing data and instruction, and memory for storing data and instructions;
      a user interface that displays regulated results data; and a communication interface that communicates with one or more networks;

a regulated software portion; and an unregulated software portion, the unregulated portion comprising at least one downloaded third-party application;

wherein at least one element of the regulated software portion is communicatively isolated from at least one element of the unregulated software portion using hardware and/or software separation, such that the at least one isolated element of the unregulated software portion cannot communicate with the at least one regulated element of the regulated software portion; and a fluid meter that operably generates fluid metering data indicative of measured fluid flow characteristics and communicates the fluid metering data to the fluid transfer register; and a network-based computing environment comprising one or more remote computing devices, wherein the network-based computing environment maintains an application database of one or more downloadable, third-party applications, and wherein the at least one isolated element of the unregulated software portion comprises at least a portion of an application from the application database in the network-based computing environment.

15. The system of claim 14, the network-based computing environment comprising one or more of:

at least one computing device disposed in a local area network; and at least one computing devise disposed in a remote, cloud-based network.

16. The system of claim 14, the at least one downloaded third-party application comprising software downloaded from the network-based computing environment to the fluid transfer register using the application database.

17. The system of claim 14, comprising a user computing device operably, communicatively coupled with the net-work-based computing environment and the fluid transfer register, and the at least one downloaded third-party application downloaded from the user computing device.

18. The system of claim 14, the at least one downloaded third-party application comprising software that provides a customized user interface on the fluid transfer register.

19. The system of claim 14, the regulated software portion of the fluid transfer register communicatively isolated from unregulated software portion such that any one of the one or more third party application is unable to transmit data to any part of the regulated software portion.

20. A method for using a fluid transfer system, comprising:

operating a fluid meter during a fluid transfer event, wherein the fluid meter operably generates fluid metering data indicative of measured fluid flow characteristics;

transferring the fluid metering data to a fluid transfer register, wherein the fluid transfer register comprises:

a regulated software portion; and an unregulated software portion, the unregulated portion is configured to run at least one third party application downloaded from the application database;

wherein at least one element of the regulated software portion is communicatively isolated from at least one element of the unregulated software portion using hardware and/or software separation, such that the at least one isolated element of the unregulated software portion cannot communicate with the at least one regulated element of the regulated software portion; and communicatively coupling the fluid transfer register to a network-based computing environment comprising a remote computing device, wherein the remote computing device maintains an application database of one or more third-party applications that are downloadable to the unregulated portion of the fluid transfer register.

* * * * *